(12) United States Patent
Wu et al.

(10) Patent No.: US 8,571,363 B2
(45) Date of Patent: Oct. 29, 2013

(54) RING RESONATOR WITH INDUCTANCE COUPLED HEAT TUNING

(75) Inventors: Wei Wu, Mountain View, CA (US); Raymond G. Beausoleil, Redmond, WA (US); Shih-Yuan Wang, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 316 days.

(21) Appl. No.: 12/743,769

(22) PCT Filed: Dec. 14, 2007

(86) PCT No.: PCT/US2007/087644
§ 371 (c)(1),
(2), (4) Date: Aug. 13, 2010

(87) PCT Pub. No.: WO2009/078855
PCT Pub. Date: Jun. 25, 2009

(65) Prior Publication Data
US 2010/0296768 A1 Nov. 25, 2010

(51) Int. Cl.
*G02B 6/42* (2006.01)
(52) U.S. Cl.
USPC .......................................................... 385/32
(58) Field of Classification Search
USPC .......................................................... 385/32
See application file for complete search history.

(56) References Cited

U.S. PATENT DOCUMENTS

| | | | | |
|---|---|---|---|---|
| 4,775,214 A | * | 10/1988 | Johnson | 385/12 |
| 5,926,496 A | * | 7/1999 | Ho et al. | 372/92 |
| 6,052,495 A | * | 4/2000 | Little et al. | 385/2 |
| 6,567,438 B2 | * | 5/2003 | Lin | 372/34 |
| 6,636,338 B1 | * | 10/2003 | Kida et al. | 359/196.1 |
| 6,701,033 B2 | * | 3/2004 | Okayama | 385/16 |
| 6,947,632 B2 | * | 9/2005 | Fischer | 385/27 |
| 7,145,660 B2 | * | 12/2006 | Margalit et al. | 356/477 |
| 7,162,120 B2 | | 1/2007 | Yamazaki | |
| 7,400,797 B2 | * | 7/2008 | Bhagavatula et al. | 385/32 |
| 7,400,798 B2 | * | 7/2008 | de Almeida et al. | 385/32 |
| 7,440,643 B2 | * | 10/2008 | Yamazaki | 385/5 |
| 7,447,387 B2 | * | 11/2008 | Shih et al. | 385/2 |
| 7,693,369 B2 | * | 4/2010 | Fan et al. | 385/32 |
| 7,738,527 B2 | * | 6/2010 | He | 372/94 |
| 7,787,176 B2 | * | 8/2010 | Kimerling et al. | 359/344 |
| 8,009,943 B2 | * | 8/2011 | Bratkovski et al. | 385/16 |
| 8,019,185 B2 | * | 9/2011 | Yap | 385/3 |
| 8,195,014 B2 | * | 6/2012 | Heideman et al. | 385/12 |
| 2002/0037134 A1 | * | 3/2002 | Akamatsu et al. | 385/32 |
| 2002/0071453 A1 | * | 6/2002 | Lin | 372/6 |
| 2004/0071386 A1 | | 4/2004 | Nunen et al. | |
| 2006/0193557 A1 | * | 8/2006 | Bradley et al. | 385/32 |
| 2006/0198416 A1 | | 9/2006 | Yamazaki | |
| 2007/0206899 A1 | * | 9/2007 | Chu et al. | 385/32 |
| 2009/0154505 A1 | * | 6/2009 | Oh et al. | 372/20 |

FOREIGN PATENT DOCUMENTS

| | | | |
|---|---|---|---|
| JP | 5-203825 | * | 8/1993 |
| JP | 2006-245344 | | 9/2006 |
| KR | 10-2007-0092059 | | 9/2007 |

OTHER PUBLICATIONS

ISA International Search Report and Written Opinion (PCT/US2007/087644).

* cited by examiner

*Primary Examiner* — Charlie Peng

(57) ABSTRACT

A ring resonator has a first optical waveguide arranged in a loop, a second optical waveguide tangentially connected to the first optical waveguide, and an electrical coil inductively coupled to the first optical waveguide.

21 Claims, 6 Drawing Sheets

RING RESONATOR WITH INDUCTANCE COUPLED HEAT TUNING

BACKGROUND

Light beams or optical signals are frequently used to transmit digital data. For example, optical signals are used in fiber optic systems for long-distance telephony and internet communication. Additionally, optical signals are frequently used to transmit data between electronic components on a single circuit board or between electronic components on adjacent or nearby circuit boards.

Consequently, optical technology plays a significant role in modern telecommunications and data communication. Examples of optical components used in such systems include optical or light sources such as light emitting diodes and lasers; waveguides; fiber optics; lenses and other optics; photo-detectors and other optical sensors; optically-sensitive semiconductors; optical modulators, and others.

Such systems making use of optical components often rely upon the precise manipulation of optical energy, usually in the form of a light beam, to accomplish a desired task, such as data communication. This is especially true in systems utilizing light for high-speed, low-energy communication between two nodes.

Often, optical resonators are used to selectively filter, switch, or modulate light beams. Ring resonators are a type of optical resonator. Ring resonators typically have an optical waveguide in a closed loop coupled to a tangential waveguide. When light of the appropriate wavelength is coupled to the loop by the tangential waveguide, the light beam builds in intensity or amplitude over multiple round-trips through the closed loop due to constructive interference. The optical energy then exits the loop into the tangential waveguide. Ring resonators have a characteristic resonant frequency, which requires selective tuning in some systems.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
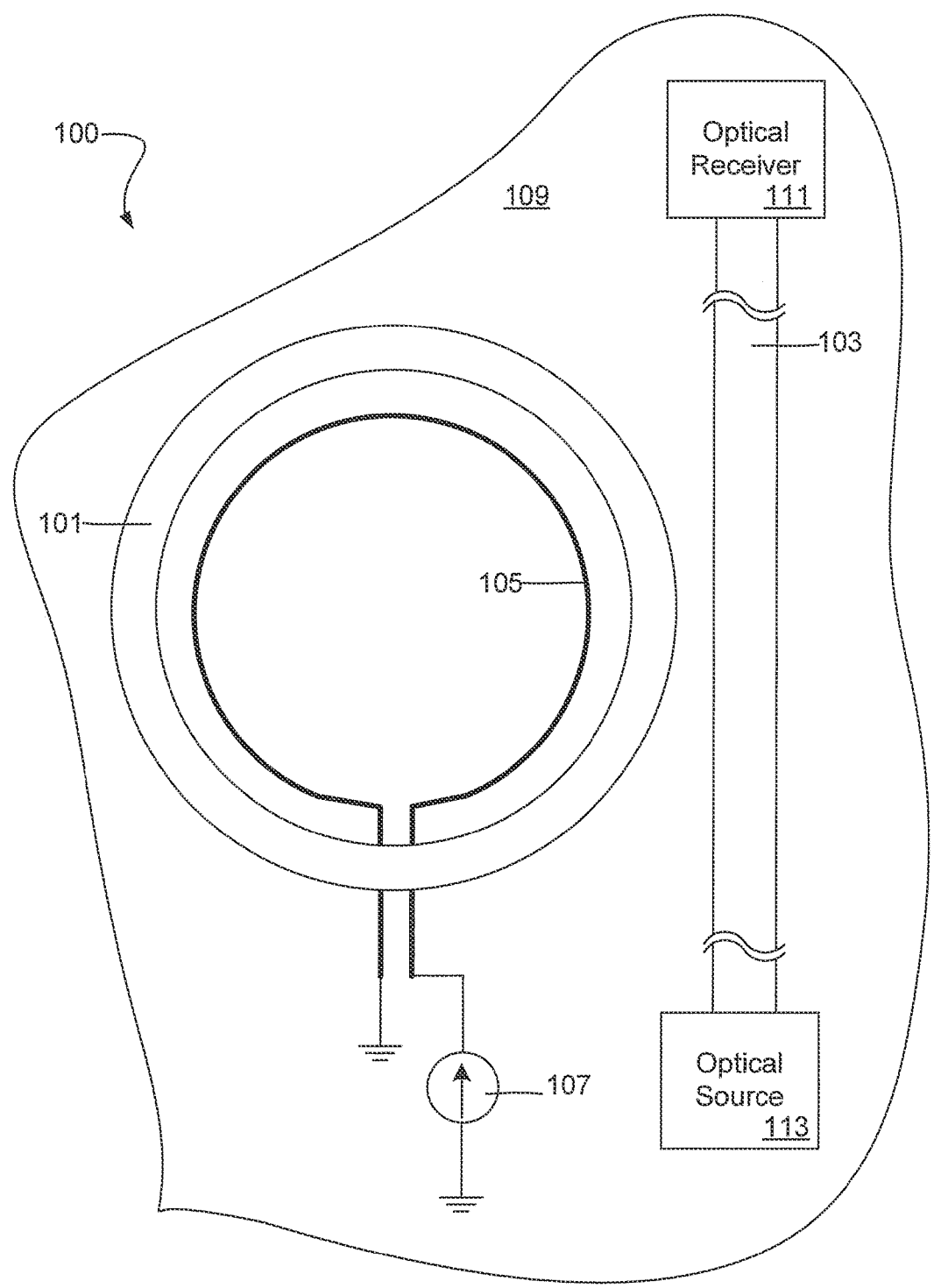
FIG. 1 is a diagram of an illustrative ring resonator having inductance coupled heat tuning, according to the principles described herein.

As used in the present specification and in the appended claims, the term "optical energy" refers to radiated energy having a wavelength generally between 10 nanometers and 500 microns. Optical energy as thus defined includes, but is not limited to, ultraviolet, visible, and infrared light. A beam of optical energy may be referred to herein as a "light beam" or "optical beam."

As used in the present specification and in the appended claims, the term "inductively coupled" refers to the physical proximity and orientation of at least two electrically conductive objects such that an appreciable electrical current flowing through one of the objects induces an appreciable corresponding electrical current in another of the objects. Two inductively coupled materials may also be referred to herein as "in electromagnetic communication."

As used in the present specification and in the appended claims, the term "optical source" refers to a device from which optical energy originates. Examples of optical sources as thus defined include, but are not limited to, light emitting diodes, lasers, light bulbs, and lamps.

As described above, ring resonators may be used in many different optical devices. Ring resonators typically have a resonant ring made of an optical waveguide in a closed loop. The resonant ring is optically coupled to a tangential waveguide. When light of the appropriate wavelength is coupled to the loop by the tangential waveguide, the light beam builds in intensity or amplitude over multiple round-trips through the closed loop due to constructive interference. The optical energy then exits the loop into the tangential waveguide. Ring resonators have a characteristic resonant frequency, which requires selective tuning in some systems.

Additionally, the resonant frequency in a ring resonator may be adjusted by selectively heating or cooling the resonant ring, thus altering the operating temperature of the resonator. It may be desirable, therefore, to integrate a temperature altering device in a ring resonator that can uniformly alter the temperature of the resonator. Moreover, it may be desirable to accurately control such a temperature altering device in a ring resonator to precisely tune the ring resonator to a desired resonant frequency.

To accomplish these and other goals, the present specification discloses a ring resonator apparatus in which heating is realized by an electrical current within the resonant ring. The current is generated by an electrical coil inductively coupled to the resonant ring. The current in the resonant ring, and hence the temperature of the resonant ring, may be adjusted by selectively altering an electrical current in the electrical coil.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The principles disclosed herein will now be discussed with respect to illustrative systems and methods.

Illustrative Systems

Referring now to FIG. 1, a diagram of an illustrative ring resonator (100) is shown. The illustrative ring resonator (100) has a first optical waveguide or "resonant ring" (101) arranged in a loop. A second optical waveguide (103) is tangentially connected to the first optical waveguide (101). In other words, the second optical waveguide (103) is arranged tangentially with respect to the loop of the first optical waveguide (101). The first and second optical waveguides (101, 103) are in optical communication with each other at the tangential point on the first optical waveguide (101).

The optical waveguides (101, 103) may be fabricated out of semiconductor materials, such as silicon, gallium arsenide, germanium, and the like. The optical waveguides (101, 103) are configured to conduct electrical currents in addition to optical energy, and are fabricated on a substrate (109), such as silicon. In some embodiments, an insulating layer such as silicon dioxide may be fabricated on the substrate (109) and encapsulate the optical waveguides (101, 103).

The ring resonator (100) has a resonant frequency, which is at least partially determined by the cross-sectional dimensions of the first and second optical waveguides (101, 103), the ring dimensions of the first optical waveguide (101), electrical charges, and operating temperature of the ring resonator (100). The ring resonator (100) is configured to sustain optical energy having a wavelength characteristic of the resonant frequency or a range of wavelengths above and below the resonant frequency. All other optical energy is attenuated or suppressed by destructive interference.

Optical energy is generated by an optical source (113), such as a laser or a light emitting diode (LED) and enters the ring resonator (100) through a first end of the second optical waveguide (103). Optical energy having the correct wavelength (i.e. at or near the resonant frequency of the ring resonator [100]) enters the first optical waveguide (101) at the tangential junction of the first and second waveguides (101, 103) and resonates through the loop of the first optical waveguide (101) prior to exiting back into the second optical waveguide (103). The optical energy may then be transmitted through the second optical waveguide (103) to an optical receiver (111) disposed at a second end of the second optical waveguide (103), such as a photodiode or another waveguide.

The resonant frequency of the ring resonator (100) may be tuned by altering the operating temperature of the first optical waveguide (101). For example, raising the temperature of the first optical waveguide (101) may cause the resonant frequency of the ring resonator (100) to decrease. This may occur due to thermal expansion in the first optical waveguide (101) and an index of refraction (n) in the material of the first waveguide (101) that increases slightly with temperature. Similarly, a decrease in the operating temperature of the first optical waveguide (101) may cause the resonant frequency of the ring resonator (100) to increase.

The operating temperature of the first optical waveguide (101) is altered by selectively altering the amount of electrical current flowing through the first optical waveguide (101). By increasing the amount of current that flows through the first optical waveguide (101), heat is generated by the inherent resistance in the material of the first optical waveguide (101), and the operating temperature increases, thus reducing the resonant frequency of the ring resonator (100).

In embodiments where the first optical waveguide (101) is fabricated out of a semiconductor material, the electrical resistance of the waveguide (101) may be directly related to the amount of doping that the semiconductor material has received. In embodiments having a heavily doped semiconductor optical waveguide (101), more electrical current may be required to achieve the same increase in temperature of a lightly doped or intrinsic semiconductor optical waveguide (101).

By decreasing the amount of current that flows through the first optical waveguide (101), less heat is generated by the inherent resistance in the material of the first optical waveguide (101). Consequently, the operating temperature decreases, thus increasing the resonant frequency of the ring resonator (100).

Figure 6:
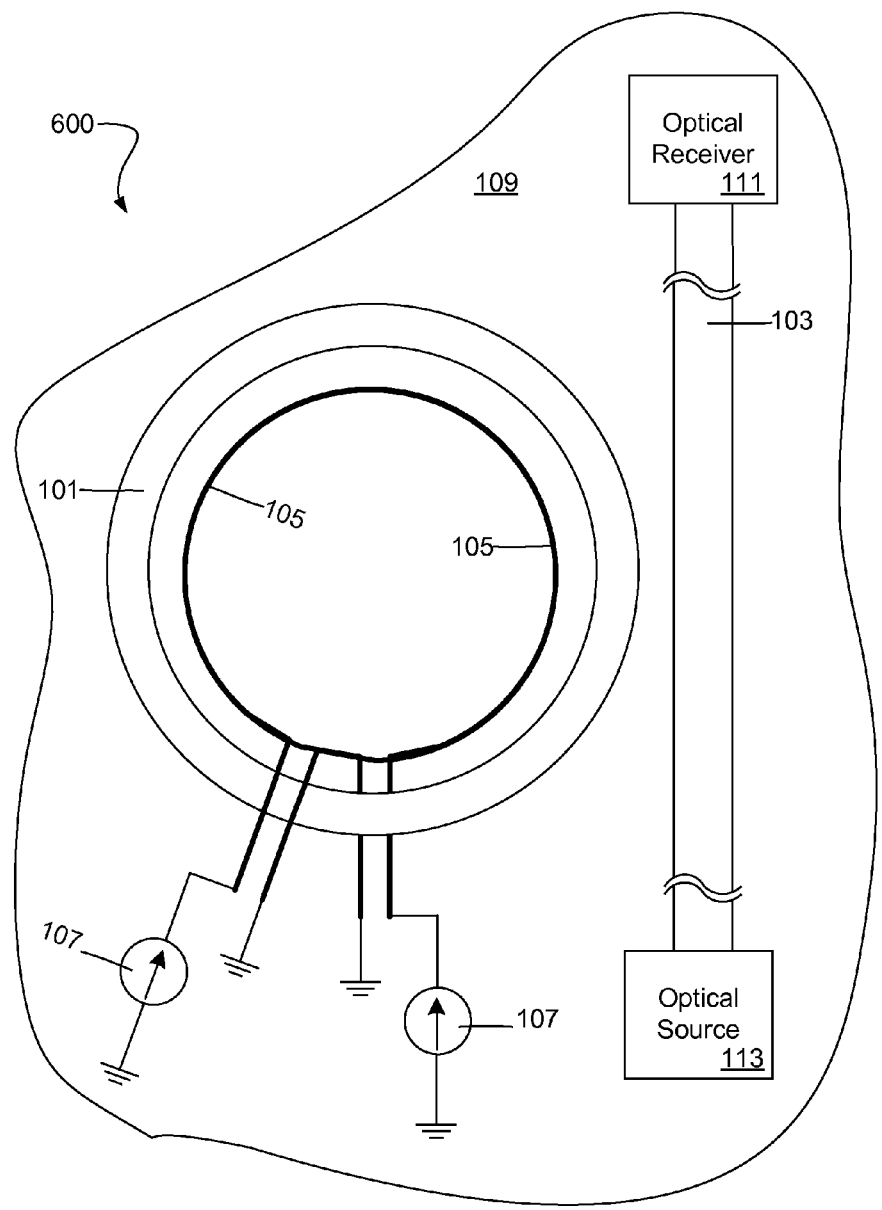
FIG. 6 is a diagram of an illustrative ring resonator having inductance coupled heat tuning comprising multiple coils arranged adjacent to, and inductively coupled with, a waveguide according to another example of the principles described herein.

In the illustrated example, electrical current is made to flow through the first optical waveguide (101) through induction. An electrical coil (105) is inductively coupled to the first optical waveguide (101). The electrical coil (105) shown in the present example has a single-turn of an electrically conductive material. However, electrical coils having multiple turns of electrically conductive material may be used in other embodiments. The electrical coil (105) is substantially concentric with the first optical waveguide, and is physically disposed beneath the first optical waveguide (101). However, it will be understood that the coil (105) can be arranged in any of a variety of configurations so long as it is inductively coupled to, and able to influence the current flowing in the waveguide (101). For example, the coil (105) may be inside, outside or immediately above or below the waveguide (101). Also, the coil (105) may comprise multiple coils arranged adjacent to, and inductively coupled with, the waveguide (101) as shown in FIG. 6.

A current source (107) is in electrical communication with one end of the electrical coil (105). The current flowing through the first optical waveguide (101) may be adjusted by adjusting the amount of current flowing into the electrical coil (105) from the current source (107). Therefore, the operating temperature, and by extension the resonant frequency, of the first optical waveguide (101) may be selectively altered by selectively altering the amount of current provided to the electrical coil (105) by the current source (107).

Electrical current generated by the current source (107) enters the electrical coil (105) at one end. The current then exits the electrical coil (105) to ground or another common electrical node as best suits the individual system utilizing the ring resonator (100).

In some embodiments, a current may be normally flowing through the electrical coil (105) from the current source (107) as a default operating condition. In this way, the electrical current may be both decreased and increased from the default current flow, thus allowing net increases and decreases in the resonant frequency of the ring resonator (100).

In other embodiments, the electrical coil (105) by default may not have any electrical current flowing from the current source (107). When it is desired that the resonant frequency of the ring resonator be reduced, current flows into the coil (105) and may be increased as needed. While these embodiments may not allow an increase in the resonant frequency from the default state using the electrical coil (105), power may be better conserved.

Figure 2:
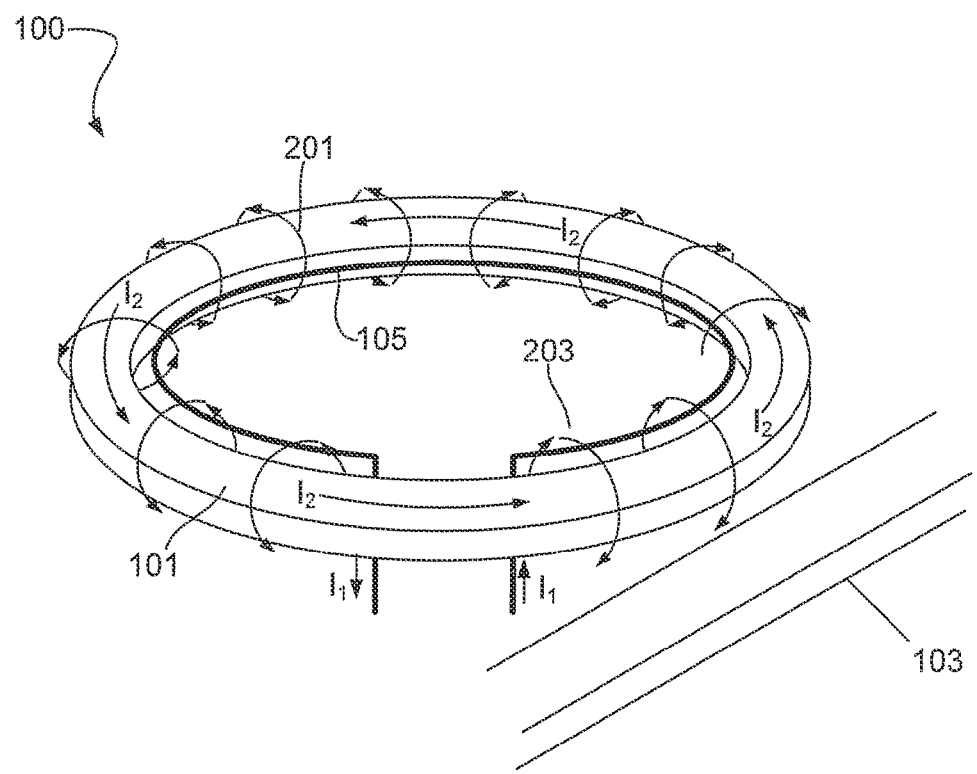
FIG. 2 is a diagram of illustrative electrical currents and magnetic fields in an illustrative ring resonator having inductance coupled heat tuning, according to the principles described herein.

Referring now to FIG. 2, a diagram of illustrative electrical currents and magnetic fields in the illustrative ring resonator (100) is shown. As mentioned previously, the electrical coil (105) and the first optical waveguide (101) are inductively coupled. This means that the electrical coil (105) and the first optical waveguide (101) are in the correct orientation and in close enough proximity such that an electrical current induced in one of the electrical coil (105) and the first optical waveguide (101) induces a corresponding electrical current in the other of the electrical coil (105) and the first optical waveguide (101). The induced electrical current in the first optical waveguide (101) is proportional in magnitude to the original electrical current.

The electrical current source (107, FIG. 1) is shown with a generated first electrical current (I1) that is received into a first end of the electrical coil (105). The first electrical current (I1)

is conducted throughout the electrical coil (105) and exits at a second end of the electrical coil (105).

Electromagnetic fields (201, 203) are created from the generated electric current (I1) and form loops of electromagnetic potential around the electrical coil (105). Some of the electromagnetic fields loop around both the first optical waveguide (101) and the electrical coil. These electromagnetic fields cause an electrical current (I2) to flow in the first optical waveguide (101) through the principle of induction.

While the electrical current (I2) induced in the first optical waveguide (101) is proportional in magnitude to the electrical current (I1) generated in the electrical coil (105), this proportionality may be affected by a variety of factors. For example, the resistivity of the semiconductor material out of which the first optical waveguide (101) is fabricated may affect the magnitude of the induced current (I2). In optical waveguides (101) having a more resistive nature, the magnitude of the induced current (I2) will be lower, and vice versa.

Another factor that may affect the proportionality between the induced current (I2) and the generated current (I1) is the distance between the electrical coil (105) and the first optical waveguide (101). A greater distance between the electrical coil and the first optical waveguide (101) may reduce the magnitude of the electric current (I2) induced in the first optical waveguide (101). Moreover, the number of turns in the electrical coil (105) and the physical medium in between the electrical coil (105) and the first optical waveguide (101) may also affect the magnitude of the induced current (I2) in proportion to the generated current (I1).

Figure 3:
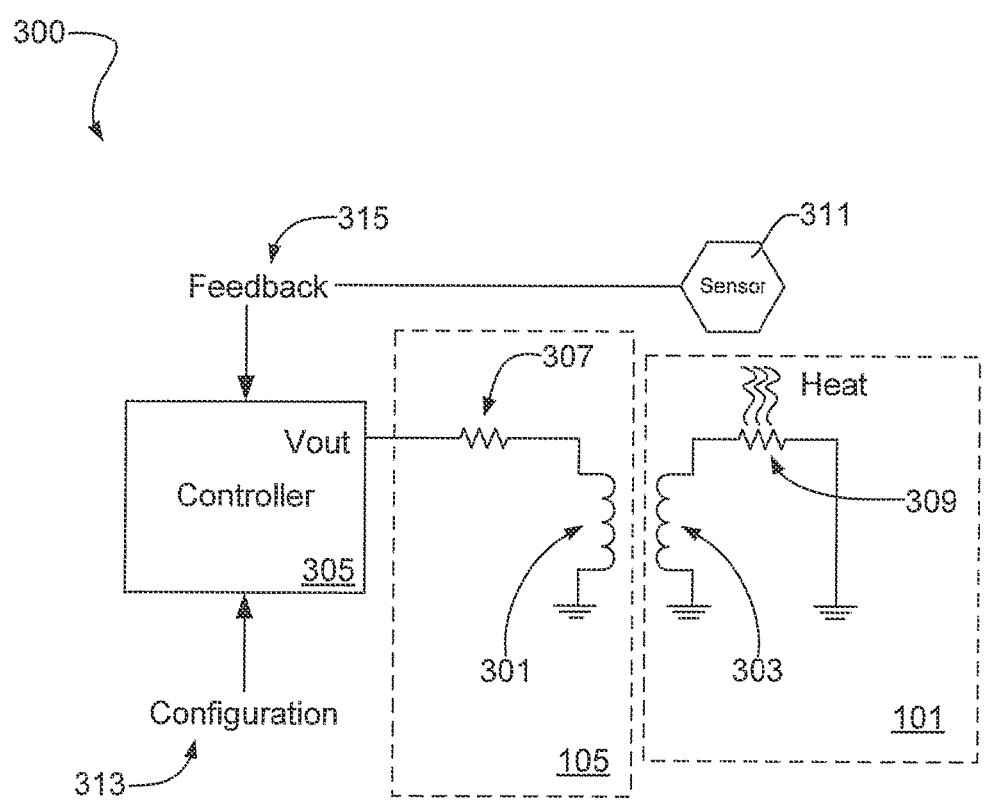
FIG. 3 is a schematic electrical diagram of an illustrative system having a ring resonator with inductance coupled heat tuning, according to the principles described herein.

Referring now to FIG. 3, a block diagram is shown of an illustrative system (300) having a ring resonator with inductance coupled heat tuning. The first optical waveguide (101) of the ring resonator (100, FIG. 1) is modeled electrically in the present system (300) as an inductor (303) and a characteristic resistance (309) in series. Similarly, the electrical coil (105) is modeled in the present system as an inductor (301) and a characteristic resistance (307) in series.

The inductor (301) of the electrical coil (105) and the inductor (303) of the first optical waveguide (101) are shown in electromagnetic communication as a pair of mutual inductors. Thus, a current flowing through the resistance (307) of the electrical coil (105) may induce a corresponding current in the inductor (303) of the first optical waveguide (101), which may flow through the resistance (309) of the first optical waveguide (101) and generate heat. The heat generated by the induced current flowing through the resistance (309) of the first optical waveguide (101) may affect the optical properties of the waveguide (101), specifically the resonant frequency, as has been described previously.

The current in the electrical coil (105) is generated by an electronic controller (305). The generated current in the electrical coil (105) flows due to an output voltage (Vout) from the electronic controller (305) that is in electrical communication with the electrical coil (105). The electronic controller (305) may include one or more processing elements, such as microcontrollers, application specific integrated circuits (ASICs), and the like. The electronic controller (305) may be configured to run an algorithm that adjusts the current in the electrical coil (105) according to the particular optical needs of a specific implementation.

The electronic controller (305) may receive a configuration (313) that affects the way in which the resonant frequency of the ring resonator (100, FIG. 1) is controlled, according to the particular needs of the consumer. The configuration (313) may be received directly through a user interface, or from another electronic component in communication with the electronic controller (305).

Additionally, the illustrative system (300) includes a sensor (311) configured to detect an attribute of the ring resonator and provide feedback (315) to the controller (305). The feedback (315) may then be used by the controller in its specific algorithm to determine the management of the current generated in the electrical coil (105).

In the present example, the sensor (311) is shown as a temperature sensor which detects heat dissipated by the first optical waveguide (101). By measuring the temperature of the first optical waveguide (101), the approximate resonant frequency of the ring resonator (100, FIG. 1) may be determined at the controller (305) and adjustments may be made to the current in the electrical coil (105) as needed.

In other embodiments, the sensor (311) may be an optical sensor that determines specific optical properties of the ring resonator (100, FIG. 1), such as the resonant frequency of the ring resonator or the wavelength of optical energy transmitted through the first optical waveguide (101). In still other embodiments, the sensor (311) may be an electrical current sensor. The sensor (311) may be analog or digital, and a plurality of sensors may be used in some embodiments.

Illustrative Methods

Figure 4:
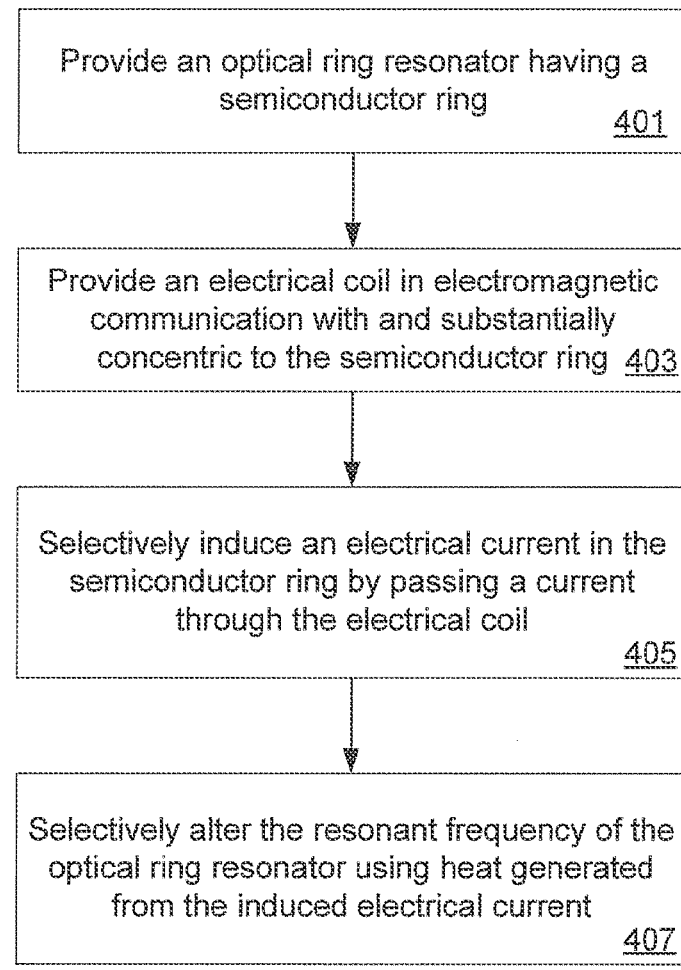
FIG. 4 is a flowchart of an illustrative method of tuning a ring resonator, according to the principles described herein.

Referring now to FIG. 4, a flowchart of an illustrative method (400) of selectively tuning a ring resonator is shown. The method (400) includes providing (step 401) an optical ring resonator having a semiconductor ring. An electrical coil is provided (step 403) in electromagnetic communication with and substantially concentric to the semiconductor ring.

An electrical current is selectively induced (step 405) in the semiconductor ring by passing a current through the electrical coil. The resonant frequency of the optical ring resonator is then selectively altered (step 407) using heat generated from the induced electrical current. The resonant frequency of the optical ring resonator may be decreased by increasing the electrical current passed through the electrical coil. Likewise, the resonant frequency of the optical ring resonator may be increased by decreasing the electrical current passed through the electrical coil.

In some embodiments, the method (400) may further include receiving input from at least one sensor. Examples of sensors that may be used include, but are not limited to, temperature sensors, current sensors, optical sensors and combinations thereof. Additionally, the method (400) may include the step of dynamically receiving a desired resonant frequency configuration from an electrical component. The configuration may then be used to control the amount of current generated in the electrical coil.

Figure 5:
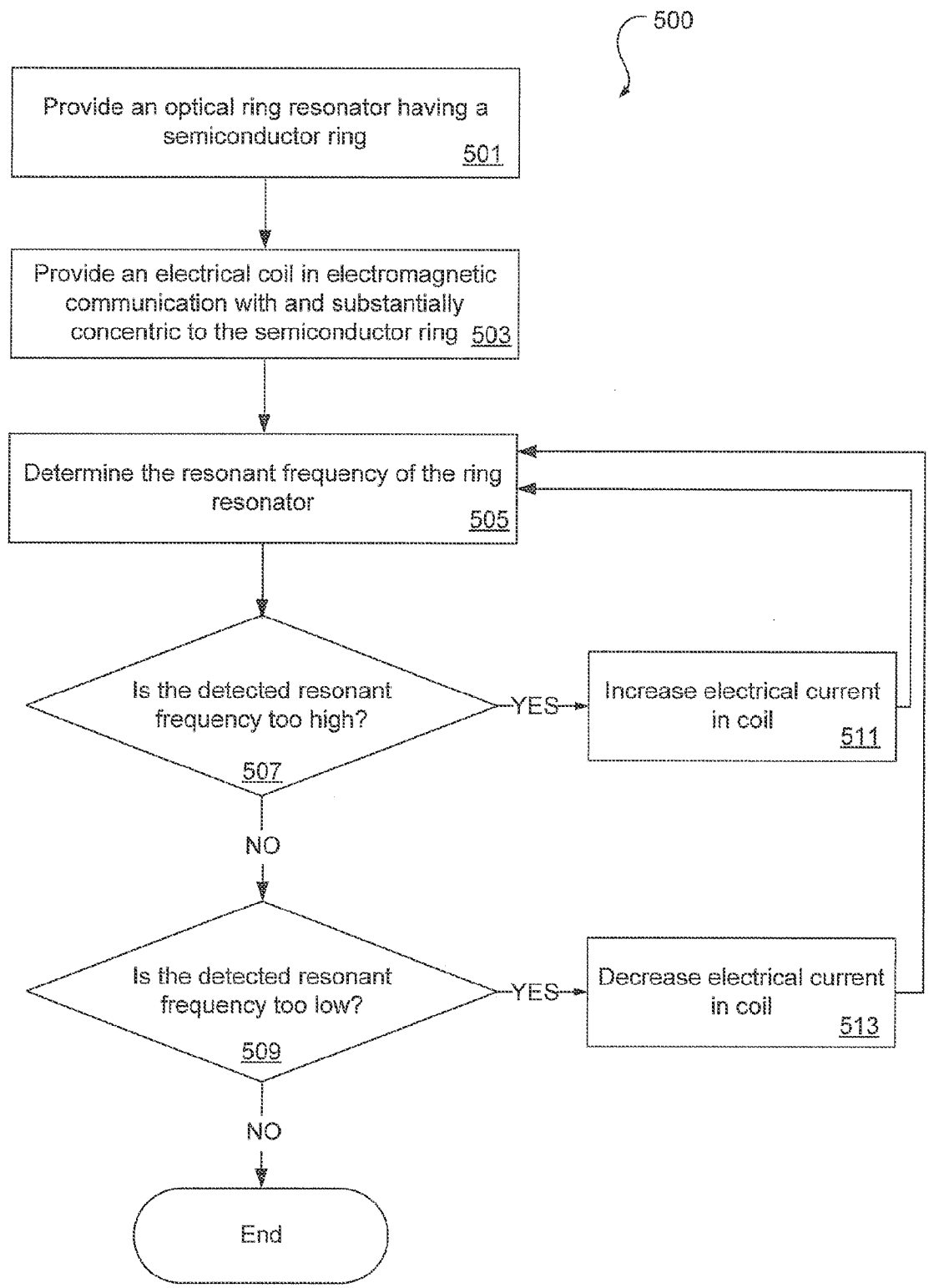
FIG. 5 is a flowchart of an illustrative method of tuning a ring resonator, according to the principles described herein.

Referring now to FIG. 5, a flowchart of another illustrative method (500) of tuning a ring resonator is shown. The method (500) includes providing (step 501) an optical ring resonator having a semiconductor ring. An electrical coil is provided (step 503) in electromagnetic communication with and substantially concentric to the semiconductor ring.

The resonant frequency of the ring resonator is determined (step 505) using a sensor or other means. If it is determined (decision 507) that the detected resonant frequency is too high, an electrical current in the electrical coil is increased (step 511) to increase the temperature of the ring resonator. Then, the resonant frequency of the ring resonator is determined (step 505) again.

If it is determined (decision 509) that the resonant frequency of the ring resonator is too low, the electrical current in the electrical coil is decreased (step 513) to decrease the temperature of the ring resonator. Then, the resonant frequency of the ring resonator is determined (step 505) again. Using feedback from the determined resonant frequency, the steps of increasing (step 511) the electrical current in the coil and decreasing (step 513) the electrical current in the coil may be performed until the detected resonant frequency is at a desired level.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A ring resonator, comprising:
   a first optical waveguide arranged in a loop;
   a second optical waveguide tangentially connected to said first optical waveguide; and
   an electrical coil, in which the electrical coil is in electromagnetic communication with said first optical waveguide such that an electrical current flowing through the electrical coil induces a corresponding electrical current in the first optical waveguide,
   in which the resonant frequency of the first optical waveguide is selectively altered by altering the electrical current flowing through the electrical coil to create the corresponding electrical current in the first optical waveguide, the corresponding electrical current in the first optical waveguide altering the resistance of the first optical waveguide, the altered resistance of the first optical waveguide altering the operating temperature of the first optical waveguide, the altered operating temperature of the first waveguide altering the resonant frequency of the first optical waveguide.

2. The ring resonator of claim 1, wherein said electrical coil is substantially concentric with said first optical waveguide.

3. The ring resonator of claim 1, further comprising a number of additional electrical coils in electromagnetic communication with said first optical waveguide.

4. The ring resonator of claim 1, wherein said first and second optical waveguides are fabricated out of semiconductor material.

5. The ring resonator of claim 1, further comprising a sensor for determining a resonant frequency of said first optical waveguide.

6. The ring resonator of claim 5, wherein output from said sensor is used to control an electrical current source outputting said electrical current to said electrical coil.

7. The ring resonator of claim 5, wherein said sensor is a temperature sensor.

8. An optical system, comprising:
   a ring resonator having a first optical waveguide arranged in a loop, a second optical waveguide tangentially connected to said first optical waveguide,
   an electrical coil in electromagnetic communication with said first optical waveguide; and
   a controller in electrical communication with said electrical coil;
   in which said controller selectively tunes a resonant frequency of said ring resonator by altering an electrical current flowing through the electrical coil to create a corresponding electrical current in the first optical waveguide,
   in which the corresponding electrical current in the first optical waveguide alters the resistance of the first optical waveguide, the altered resistance of the first optical waveguide altering the operating temperature of the first optical waveguide, the altered operating temperature of the first optical waveguide altering the resonant frequency of the first optical waveguide.

9. The optical system of claim 8, further comprising a sensor in communication with said controller.

10. The optical system of claim 9, wherein said sensor is selected from the group consisting of: temperature sensors, current sensors, optical sensors, and combinations thereof.

11. The optical system of claim 8, wherein said controller is configured to increase said electrical current flow through said electrical coil to decrease said resonant frequency.

12. The optical system of claim 8, wherein said controller is configured to decrease said electrical current flow through said electrical coil to increase said resonant frequency.

13. The optical system of claim 8, wherein said controller is configured to selectively tune said resonant frequency according to a configuration received from another electrical component.

14. The optical system of claim 8, further comprising an optical source in communication with a first end of said second waveguide.

15. The optical system of claim 8, further comprising an optical receiver in communication with a second end of said second waveguide.

16. A method of selectively tuning a ring resonator, said method comprising:
   selectively altering a resonant frequency of an optical ring resonator by altering an electrical current flowing through an electrical coil in electromagnetic communication with the optical ring resonator to create a corresponding electrical current in the optical ring resonator,
   in which the corresponding electrical current in the optical ring resonator alters the resistance of the optical ring resonator, the altered resistance of the optical ring resonator altering the operating temperature of the optical ring resonator, the altered operating temperature of the optical ring resonator altering the resonant frequency of the optical ring resonator.

17. The method of claim 16, further comprising increasing said electrical current flow to decrease said resonant frequency.

18. The method of claim 16, further comprising decreasing said electrical current flow to increase said resonant frequency.

19. The method of claim 16, further comprising receiving input from at least one sensor selected from the group consisting of: temperature sensors, current sensors, optical sensors, and combinations thereof.

20. The method of claim 16, further comprising dynamically receiving a desired resonant frequency configuration from an electrical component.

21. The ring resonator of claim 4, in which a doping level of the semiconductor material of the first optical waveguide is dependent on a desired range of currents to achieve a desired alteration in the resonant frequency of the first optical waveguide.

* * * * *